United States Patent
Chedore et al.

(10) Patent No.: US 10,250,324 B1
(45) Date of Patent: Apr. 2, 2019

(54) OPTICAL TIME-DOMAIN REFLECTOMETER INTEROPERABLE TRUNK SWITCH

(71) Applicant: Ciena Corporation, Hanover, MD (US)

(72) Inventors: Paul Chedore, Ottawa (CA); Jean-Luc Archambault, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/712,214

(22) Filed: Sep. 22, 2017

(51) Int. Cl.
*H04Q 11/00* (2006.01)
*H04B 10/071* (2013.01)

(52) U.S. Cl.
CPC ....... *H04B 10/071* (2013.01); *H04Q 11/0005* (2013.01); *H04Q 2011/0015* (2013.01)

(58) Field of Classification Search
CPC ............. H04B 10/071; H04Q 11/0005; H04Q 2011/0015
See application file for complete search history.

(56) References Cited

U.S. PATENT DOCUMENTS

| | | | |
|---|---|---|---|
| 7,231,107 B1 | 6/2007 | Zhong et al. | |
| 9,419,708 B2 | 8/2016 | Rad et al. | |
| 9,756,405 B2 | 9/2017 | Swinkels et al. | |
| 2008/0145048 A1* | 6/2008 | Wu | H04B 10/071 398/25 |
| 2010/0129082 A1 | 5/2010 | Zhong et al. | |
| 2014/0009763 A1 | 1/2014 | Bao et al. | |
| 2014/0055777 A1 | 2/2014 | Archambault et al. | |
| 2014/0072306 A1 | 3/2014 | Sridhar et al. | |
| 2014/0077971 A1 | 3/2014 | Archambault et al. | |
| 2014/0348501 A1 | 11/2014 | Boa et al. | |
| 2016/0099851 A1 | 4/2016 | Archambault et al. | |
| 2017/0117983 A1 | 4/2017 | Al Sayeed et al. | |
| 2017/0294959 A1* | 10/2017 | Archambault | H04B 10/071 |

OTHER PUBLICATIONS

Lumentum Terminal Amplifier Whitebox, 2015 Lumentum Operations LLC, pp. 1-7.

* cited by examiner

*Primary Examiner* — Leslie C Pascal
(74) *Attorney, Agent, or Firm* — Clements Bernard Walker PLLC; Christopher L. Bernard; Lawrence A. Baratta, Jr.

(57) ABSTRACT

An optical trunk switch supporting an Optical Time-Domain Reflectometer (OTDR) includes a transmit switch configured to provide an input signal to one or more of a primary fiber path and a standby fiber path; a receive switch configured to provide an output signal from one of the primary fiber path and the standby fiber path; and an OTDR connection configured to provide one or more OTDR signals to monitor an inactive path of the primary fiber path and the standby fiber.

15 Claims, 15 Drawing Sheets on the inactive path in a transmit direction and a counter-propagating OTDR signal on the inactive path in a receive direction. The OTDR connection can include an OTDR port connected to an external module which supports the one or more OTDR signals to monitor the inactive path. The OTDR connection can include an integrated OTDR system in the optical trunk switch. The one or more OTDR signals can include a co-propagating OTDR signal to monitor a transmit direction of the inactive path and a counter-propagating OTDR signal to monitor a receive direction of the inactive path. The optical trunk switch can include a splitter connected to the OTDR connection and configured to split the co-propagating OTDR signal and the counter-propagating OTDR signal to a respective one of the transmit switch and the receive switch. The transmit switch can include a 1×2 splitter and the receive switch can include a 2×2 switch, and wherein the OTDR connection is connected to the 2×2 switch to provide a counter-propagating OTDR signal to monitor a receive direction of the inactive path. The OTDR connection can receive an OTDR signal and connect to a 1×2 switch which is configured to selectively provide the OTDR signal as one of a co-propagating OTDR signal in a transmit direction on the inactive path and a counter-propagating OTDR signal in a receive direction on the inactive path.

OPTICAL TIME-DOMAIN REFLECTOMETER INTEROPERABLE TRUNK SWITCH

FIELD OF THE DISCLOSURE

The present disclosure generally relates to optical networking systems and methods. More particularly, the present disclosure relates to an Optical Time-Domain Reflectometer (OTDR) Interoperable Trunk Switch.

BACKGROUND OF THE DISCLOSURE

Optical trunk switches (also referred to as Optical Protection Switches (OPSs), optical switches, etc.), are all-optical devices that enable a single client (0:1) to support line-side protection (1+1, 1:1, optical ring protection, etc.). Specifically, an optical trunk switch can take a single optical channel (TX/RX) and provide it on two redundant fiber paths. These devices are designed to automatically detect traffic interruptions and quickly reroute/switch traffic from a primary fiber path to a standby fiber path. Optical trunk switches can be deployed in various scenarios, such as metro networks, Data Center interconnects, etc. Advantageously, optical switches are used to reduce client interfaces since a vast majority of faults are on the line side such as in the optical network affecting one of the lines. That is, fiber cuts or other failures in the optical network are more common than equipment failures, thus optical trunk switches provide a cost-effective approach to offer redundancy.

Also, Optical Time-Domain Reflectometer (OTDR) is a feature that is increasingly becoming commonplace in network deployments, such as integrated OTDR systems in an optical line system, i.e., integrated into modems, amplifiers, multiplexers, Reconfigurable Optical Add-Drop Multiplexers (ROADMs), etc. An OTDR provides detailed distance referenced characterization of the physical fiber plant. The OTDR generally operates by sending optical test signals into the fiber and detecting, at the same end, the scattered (Rayleigh backscatter) or reflected back light from points along the fiber. This information helps operators monitor and detect fiber span related issues, e.g., bad or poor slices, high attenuation, physical defects, etc.

At present, there is an incompatibility between optical trunk switches and OTDR based on the structure of conventional optical trunk switches. Specifically, optical trunk switches typically broadcast a transmit signal on both the primary and standby fiber and switch a received signal from only one of the primary and standby fiber. Thus, there is no conventional approach to use OTDR with an optical trunk switch to monitor both the primary and standby fibers while in-service. That is, the conventional optical trunk switch would send an OTDR test signal over both the primary and standby fibers in the transmit direction and only receive the OTDR test signal in the receive direction based on which fiber is currently active.

BRIEF SUMMARY OF THE DISCLOSURE

In an embodiment, an optical trunk switch supporting an Optical Time-Domain Reflectometer (OTDR) includes a transmit switch configured to provide an input signal to one or more of a primary fiber path and a standby fiber path; a receive switch configured to provide an output signal from one of the primary fiber path and the standby fiber path; and an OTDR connection configured to provide one or more OTDR signals to monitor an inactive path of the primary fiber path and the standby fiber. The transmit switch and the receive switch each can include a 2×2 switch. The OTDR connection can be connected separately to each of the transmit switch and the receive switch to provide a co-propagating OTDR signal In another embodiment, an optical trunk switch supporting an Optical Time-Domain Reflectometer (OTDR) includes a transmit 2×2 switch configured to provide an input signal to an active path and to provide a co-propagating OTDR signal to an inactive path; a receive 2×2 switch configured to provide an output signal from the active path and to provide a counter-propagating OTDR signal to the inactive path; and an OTDR connection for the co-propagating OTDR signal and the counter-propagating OTDR signal. The OTDR connection can be connected separately to each of the transmit switch and the receive switch to provide the co-propagating OTDR signal on the inactive path in a transmit direction and the counter-propagating OTDR signal on the inactive path in a receive direction. The OTDR connection can include an OTDR port connected to an external module which supports the co-propagating OTDR signal and the counter-propagating OTDR signal to monitor the inactive path. The OTDR connection can include an integrated OTDR system in the optical trunk switch. The optical trunk switch can include a splitter connected to the OTDR connection and configured to split the co-propagating OTDR signal and the counter-propagating OTDR signal to a respective one of the transmit 2×2 switch and the receive 2×2 switch. The OTDR connection can receive an OTDR signal and connect to a 1×2 switch which is configured to selectively provide the OTDR signal as one of the co-propagating OTDR signal in a transmit direction on the inactive path and the counter-propagating OTDR signal in a receive direction on the inactive path.

In a further exemplary embodiment, a method for providing an optical trunk switch supporting an Optical Time-Domain Reflectometer (OTDR) includes providing a transmit switch configured to provide an input signal to one or more of a primary fiber path and a standby fiber path; providing a receive switch configured to provide an output signal from one of the primary fiber path and the standby fiber path; and providing an OTDR connection configured to provide one or more OTDR signals to monitor an inactive path of the primary fiber path and the standby fiber. The transmit switch and the receive switch each can include a 2×2 switch. The OTDR connection can include an OTDR port connected to an external module which supports the one or more OTDR signals to monitor the inactive path. The OTDR connection can include an integrated OTDR system in the optical trunk switch. The one or more OTDR signals can include a co-propagating OTDR signal to monitor a transmit direction of the inactive path and a counter-propagating OTDR signal to monitor a receive direction of the inactive path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to an Optical Time-Domain Reflectometer (OTDR) Interoperable Trunk Switch. The OTDR interoperable trunk switch supports unidirectional or bidirectional OTDR monitoring of both the primary and standby fiber paths in-service. Generally, the OTDR interoperable trunk switch includes one or more additional optical ports to support the inclusion of OTDR test signals for monitoring an inactive fiber path. Advantageously, the OTDR interoperable trunk switch enables operators to monitor both active and inactive fiber paths extending OTDR support to optical trunk switches. Various embodiments are described which support dual or single wavelength (WL) OTDR signals as well as unidirectional and bidirectional monitoring. The unidirectional monitoring supports one fiber direction (e.g., counter-propagating in the receive direction). The bidirectional monitoring supports both fiber directions (i.e., co-propagating in the transmit direction and counter-propagating in the receive direction). The dual wavelength OTDR signals enable the additional optical port to receive both co-propagating and counter-propagating signals on the same fiber with an integrated splitter configured to split the separate wavelengths.

Conventional Optical Trunk Switch

Figure 1:
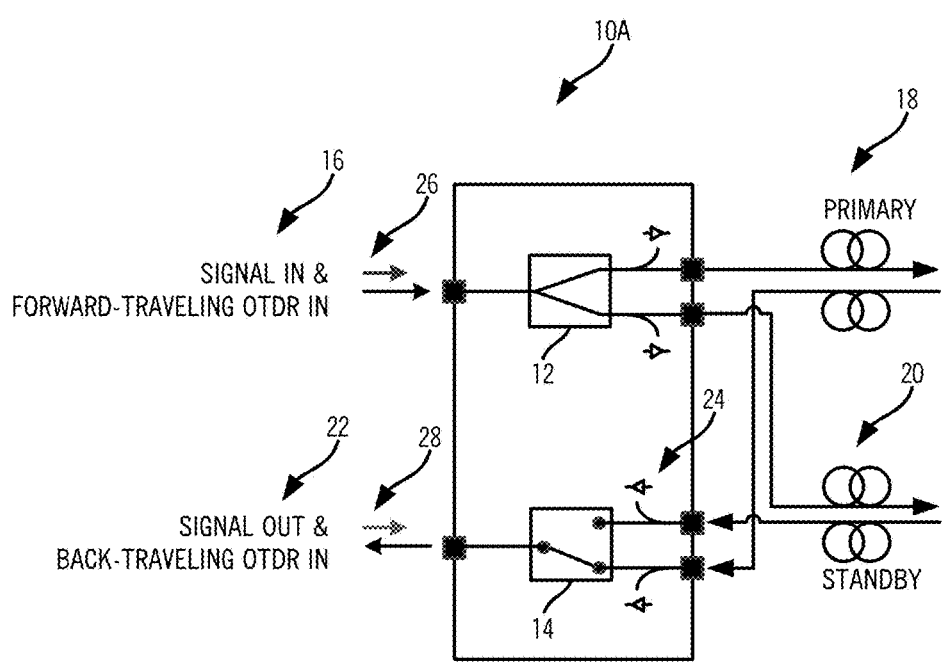
FIG. 1 is a block diagram of a conventional optical trunk switch using a splitter in the transmit direction and a 1×2 switch in the receive direction.

FIG. 1 is a block diagram of a conventional optical trunk switch 10A using a splitter 12 in the transmit direction and a 1×2 switch 14 in the receive direction. In operation, the splitter 12 is configured to receive an input signal 16 in the transmit direction and split the same input signal to both a primary fiber path 18 and a standby fiber path 20. The 1×2 switch 14 is configured to receive an output signal 22 from both the primary fiber path 18 and the standby fiber path 20 and to provide only the output signal 22 from an active fiber based on the 1×2 switch 14 setting. For example, the optical trunk switch 10A can include detectors 24 which are used to set the 1×2 switch 14. The detectors 24 can also provide monitoring of the signals from the splitter 12. The output signal 22 can include the input signal 16 from an adjacent optical trunk switch 10A (i.e., remote node) which has been provided to both the fiber paths 18, 20.

OTDR signals are incompatible with the optical trunk switch 10A. A co-propagating OTDR signal 26 travels both paths based on the splitter 12, and thus it is impossible to resolve to which path (i.e., which fiber path 18, 20) a reflection event belongs. A counter-propagating OTDR signal 28 would only monitor the active path based on the setting of the 1×2 switch 14.

Figure 2:
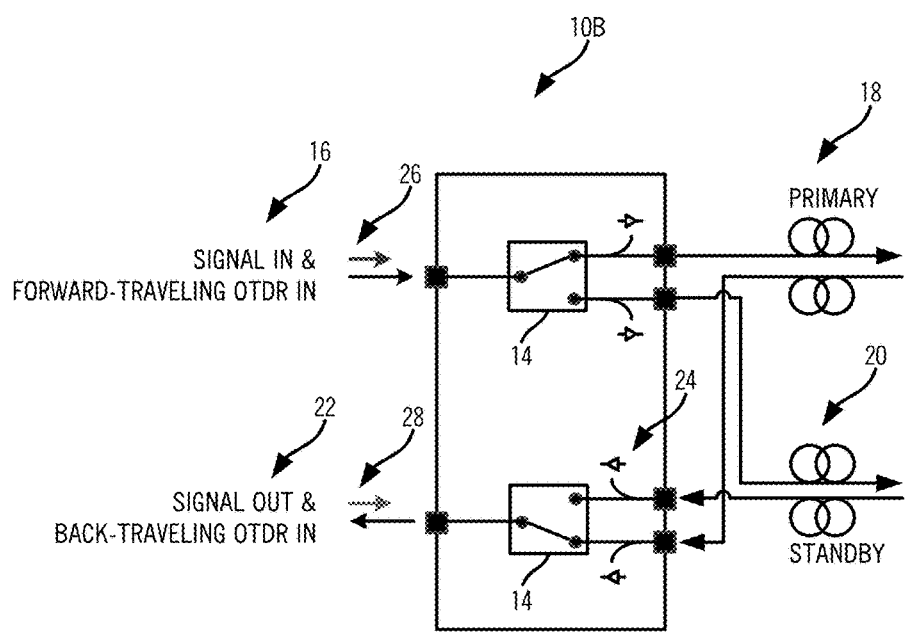
FIG. 2 is a block diagram of a conventional optical trunk switch using 1×2 switches in both the transmit direction and the receive direction.

FIG. 2 is a block diagram of a conventional optical trunk switch 10B using 1×2 switches 14 in both the transmit direction and the receive direction. The optical trunk switch 10B operates in a similar manner as the optical trunk switch 10A in the receive direction. However, the splitter 12 is replaced with a 1×2 switch 14 which directs the input signal 16 based on the setting of the 1×2 switch 14, i.e., the transmit direction only sends one copy of the input signal 16 on the active fiber of the fiber path 18, 20. Here, the OTDR signals 26, 28 can monitor a path since only one copy is sent in the transmit direction. However, the optical trunk switch 10B can only support OTDR monitoring in the active path.

Figure 3:
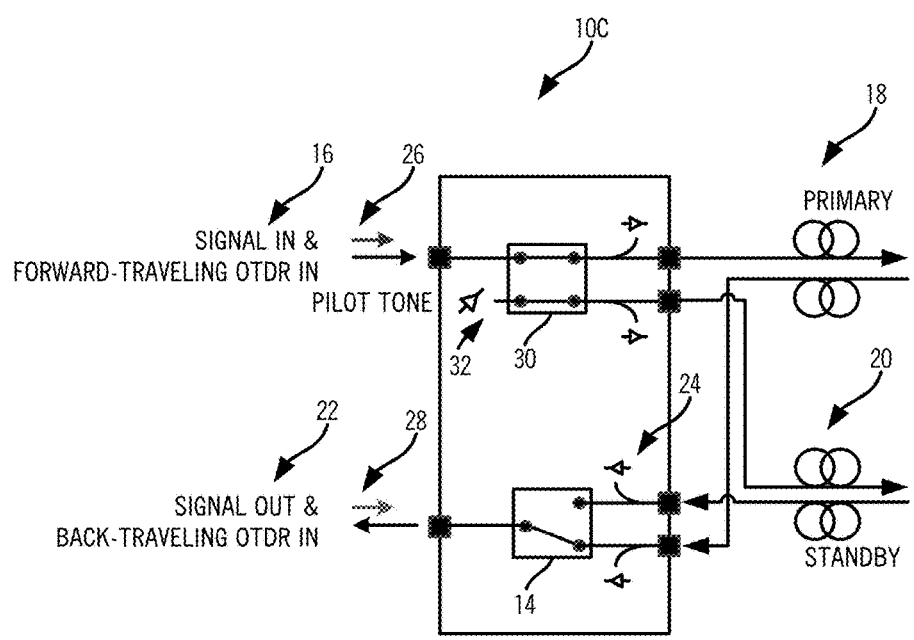
FIG. 3 is a block diagram of a convention optical trunk switch using a 2×2 switch in the transmit direction and a 1×2 switch in the receive direction.

FIG. 3 is a block diagram of a conventional optical trunk switch 10C using a 2×2 switch 30 in the transmit direction and a 1×2 switch 14 in the receive direction. The optical trunk switch 10C operates in a similar manner as the optical trunk switches 10A, 10B in the receive direction. However, the transmit direction includes the 2×2 switch 30 which is configured to provide the input signal 16 to the active fiber based on the settings of the 2×2 switch 30. Additionally, the 2×2 switch 30 has a second input 32 which is sent to the inactive fiber based on the settings of the 2×2 switch 30. For example, the second input 32 can be connected to a pilot tone which simply provides a connectivity verification at an adjacent optical trunk switch 10C. The pilot tone can simply be a signal at a specified wavelength or Amplified Stimulated Emission (ASE). The optical trunk switch 10C has the same issues related to OTDR as the optical trunk switch 10B, here again, the co-propagating and counter-propagating OTDR signals 26, 28 would only monitor the active path.

OTDR Interoperable Trunk Switch—Dual Wavelength (WL) and Bidirectional

Figure 4:
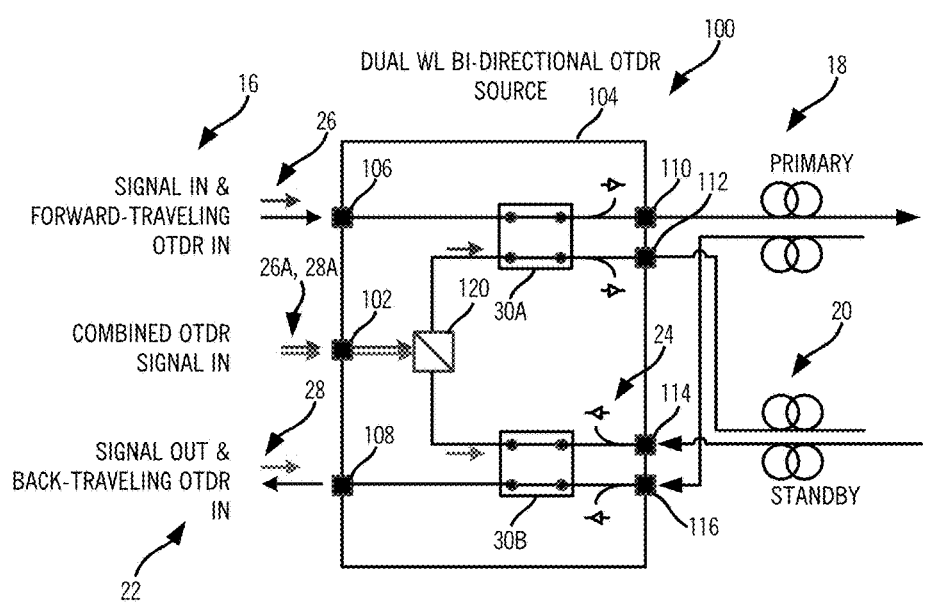
FIG. 4 is a block diagram of an OTDR interoperable trunk switch using a 2×2 switch in both the transmit direction and the receive direction and with an OTDR port enabling OTDR signals over both the primary fiber path and the and standby fiber path regardless of which is currently set as the active fiber path.

FIG. 4 is a block diagram of an OTDR interoperable trunk switch 100 using 2×2 switches 30A, 30B in both the transmit direction and the receive direction and with an OTDR port 102 enabling OTDR signals over both the primary fiber path 18 and the standby fiber path 20 regardless of which is currently set as the active fiber path. Specifically, the OTDR interoperable trunk switch 100 uses dual wavelengths for the OTDR signals 26, 28, 26A, 28A and supports bidirectional OTDR monitoring of both fiber paths 18, 20.

The OTDR interoperable trunk switch 100 can include a housing 104 with three client-side ports 102, 106, 108 and four line-side ports 110, 112, 114, 116. The client-side port 106 is configured to receive the input signal 16 along with the co-propagating OTDR signal 26 and connects to an input port of the 2×2 optical switch 30A. The co-propagating OTDR signal 26 is configured to provide OTDR monitoring in the transmit direction on the active fiber (pair). As described herein, the physical fibers include the primary fiber path 18 and the standby fiber path 20. These fiber paths 18, 20 can further be categorized as active and inactive, and either can be active or inactive based on the settings of the 2×2 optical switches 30A, 30B.

The client-side port 108 is configured to receive the output signal 22 from the 2×2 optical switch 30B in the receive direction and to provide the counter-propagating OTDR signal 28 to the optical switch 30B. The counter-propagating OTDR signal 28 is configured to provide OTDR monitoring in the receive direction on the active fiber (pair). Thus, from an OTDR perspective, the OTDR interoperable trunk switch 100 operates in a similar manner as the OTDR interoperable trunk switches 10B, 10C in terms of monitoring the active fiber (pair).

Additionally, the OTDR interoperable trunk switch 100 includes the OTDR port 102 to receive OTDR signals 26A, 28A for monitoring the inactive fiber path which is the standby fiber path 20. In this example, the OTDR port 102 is shown as a single port carrying both the OTDR signals 26A, 28A at different wavelengths. The OTDR interoperable trunk switch 100 can include for example a red/blue splitter 120 which splits the OTDR signals 26A, 28A between the transmit direction and the receive direction. The red/blue splitter 120 is configured to send the OTDR signal 26A to the 2×2 optical switch 30A and the OTDR signal 28A to the 2×2 optical switch 30B. The 2×2 optical switches 30A, 30B enable the inactive fiber path which is the standby fiber path 20 to receive the OTDR signals 26A, 28A thus enabling OTDR monitoring of the inactive fiber path which is the standby fiber path 20. Note, the OTDR port 102 can be two separate ports each connected to a respective 2×2 optical switch 30A, 30B without requiring the red/blue splitter 120.

The 2×2 switches 30A, 30B are a cross-bar switch which receives two inputs and can provide each of the two inputs to either output based on the current settings. In FIG. 4, the 2×2 switches 30A, 30B are shown with the top input connected to the top output and the bottom input connected to the bottom output. Thus, the client-side port 106 is connected to the line-side port 110 which connects to the primary fiber path 18 in the transmit direction. The client-side port 108 is connected to the line-side port 116 which connects to the primary fiber path 18 in the receive direction. The standby fiber path 20 is inactive in this example, and the line-side port 112 is connected to the OTDR port 102 receiving the co-propagating OTDR signal 26A. The line-side port 114 is connected to the OTDR port 102 receiving the counter-propagating OTDR signal 28A. Thus, the OTDR signals 26A, 28A can monitor the standby fiber path 20 which is inactive. In a switch scenario where the standby fiber path 20 becomes active, the 2×2 switches 30A, 30B would switch the top ports to the bottom ports.

The use of 2×2 cross-bar switches at both the near and far end allows both co-propagating and/or counter-propagating OTDR signals 26, 28, 26A, 28A to be injected into the active and standby fiber plant simultaneously. This capability allows the OTDR signals 26, 28, 26A, 28A to monitor the standby fiber path and also to validate a repair before declaring a damaged fiber path usable again.

Figure 5:
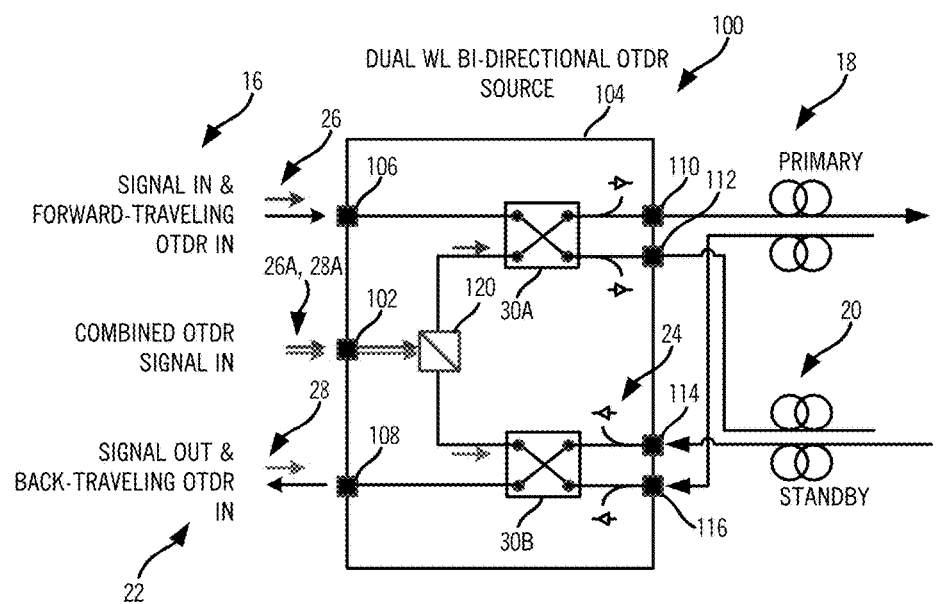
FIG. 5 is a block diagram of the OTDR interoperable trunk switch with the 2×2 switches switched from the configuration of FIG. 4.

FIG. 5 is a block diagram of the OTDR interoperable trunk switch 100 with the 2×2 switches 30A, 30B switched from the configuration of FIG. 4. Again, in FIG. 4, the OTDR signals 26, 28 provide OTDR monitoring of the active fiber path which is the primary fiber path 18. The OTDR signals 26A, 28A from the OTDR port 102 provide OTDR monitoring of the inactive fiber path which is the standby fiber path 20. In FIG. 5, the OTDR interoperable trunk switch 100 has switched such that the standby fibers 20 are now active and the OTDR signals 26, 28 provide OTDR monitoring of the standby fibers 20. The OTDR signals 26A, 28A from the OTDR port 102 provide OTDR monitoring of the inactive fiber path which is the primary fiber path 18 in FIG. 5.

Figure 6:
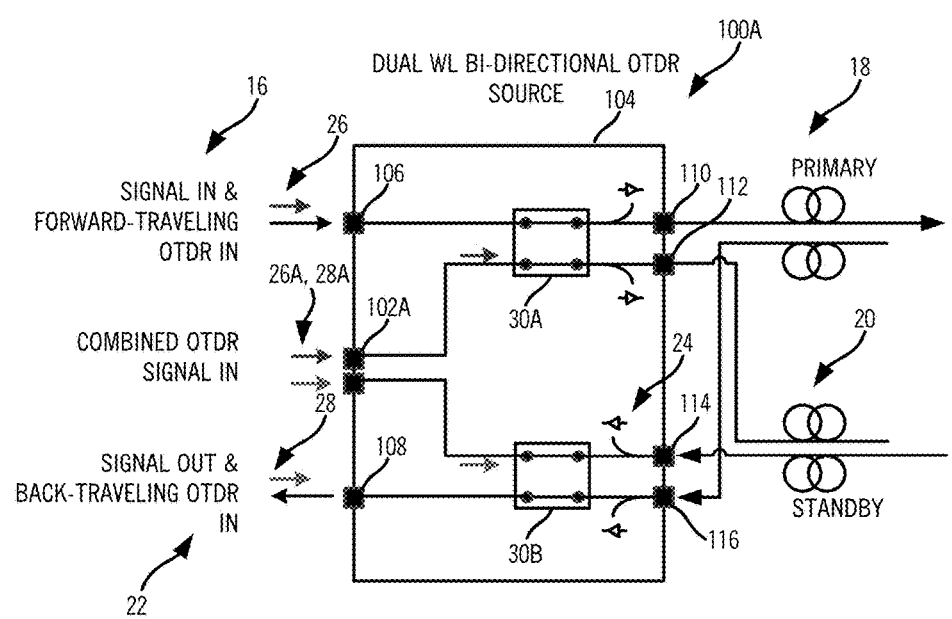
FIG. 6 is a block diagram of an OTDR interoperable trunk switch with an OTDR port which provides separate inputs for the OTDR signals.

FIG. 6 is a block diagram of an OTDR interoperable trunk switch 100A with an OTDR port 102A which provides separate inputs for the OTDR signals 26A, 28A thereby removing the red/blue splitter 120. Specifically, the OTDR interoperable trunk switch 100A operates in a similar manner as the OTDR interoperable trunk switch 100 but receives each of the OTDR signals 26A, 28A separately and thus does not require the red/blue splitter 120.

OTDR Interoperable Trunk Switch—Single Wavelength (WL) and Unidirectional

Figure 7:
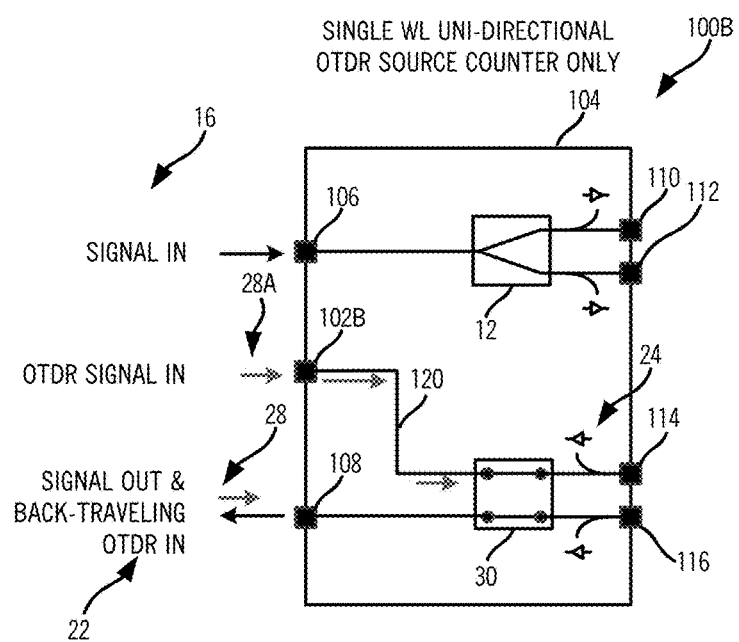
FIG. 7 is a block diagram of an OTDR interoperable trunk switch with an OTDR port supporting a single wavelength counter-propagating OTDR signal for unidirectional OTDR monitoring.

FIG. 7 is a block diagram of an OTDR interoperable trunk switch 100B with an OTDR port 102B supporting a single wavelength counter-propagating OTDR signal 28A for unidirectional OTDR monitoring. Specifically, the OTDR interoperable trunk switch 100B includes the splitter 12 in the transmit direction to split the input signal 16 on the client-side port 106 to both line-side ports 110, 112. There is no OTDR signal in the transmit direction hence the description of unidirectional OTDR monitoring. The receive direction includes a 2×2 switch 30 with one input connected to the client-side port 108 and another input connected to the OTDR port 102B. The outputs of the 2×2 switch 30 connect to the line-side ports 114, 116. With this configuration, the counter-propagating OTDR signal 28 supports OTDR monitoring on the active fiber in the receive direction, and the counter-propagating OTDR signal 28A supports OTDR monitoring on the inactive fiber in the receive direction.

OTDR Interoperable Trunk Switch—Single Wavelength (WL) and Bidirectional

Figure 8:
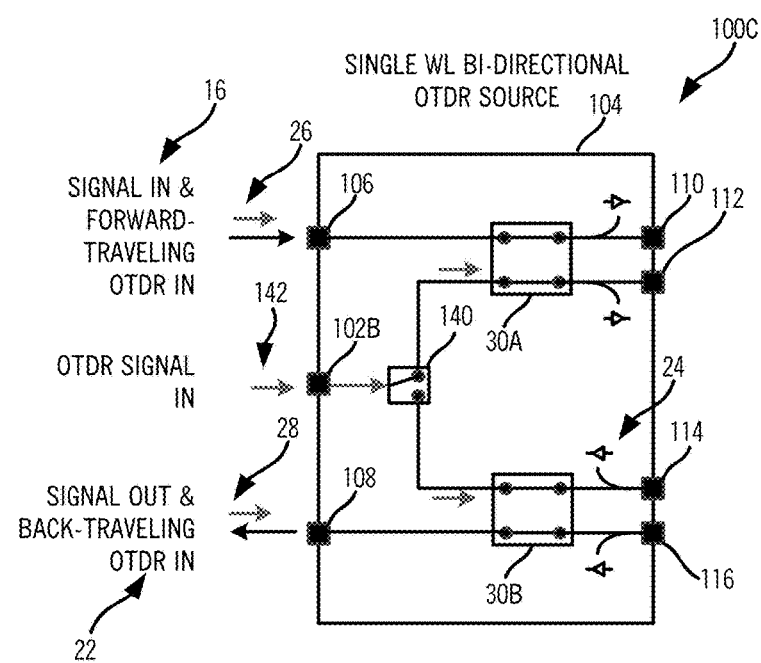
FIG. 8 is a block diagram of an OTDR interoperable trunk switch with an OTDR port supporting a single wavelength counter-propagating OTDR signal along with a 1×2 switch for bidirectional OTDR monitoring.

FIG. 8 is a block diagram of an OTDR interoperable trunk switch 100C with an OTDR port 102B supporting a single wavelength counter-propagating OTDR signal 28A along with a 1×2 switch 140 for bidirectional OTDR monitoring. The OTDR interoperable trunk switch 100C is similar to the OTDR interoperable trunk switch 100 with the 2×2 optical switches 30A, 30B in FIG. 4, but the red/blue splitter 120 is replaced with the 1×2 switch 140 which can switch an OTDR signal 142 to either the transmit direction where the OTDR signal 142 operates as the co-propagating OTDR signal 26 or to the receive direction where the OTDR signal 142 operates at the counter-propagating OTDR signal 28. Similar to the OTDR interoperable trunk switch 100B, the OTDR interoperable trunk switch 100C includes the OTDR port 102B which receives the OTDR signal 142 which is a single wavelength OTDR signal that can operate as either the co-propagating OTDR signal 26 or the counter-propagating OTDR signal 28 based on the 1×2 switch 140 setting.

In this manner, the OTDR interoperable trunk switch 100C can continuously monitor the active fiber with the OTDR signals 26, 28 and selectively monitor the inactive fiber in the receive direction or the transmit direction one at a time. That is, the 1×2 switch 140 can send the OTDR signal 142 to either the receive direction or the transmit direction of the inactive fiber path.

OTDR Interoperable Trunk Switch—Integrated OTDR Source

Figure 9:
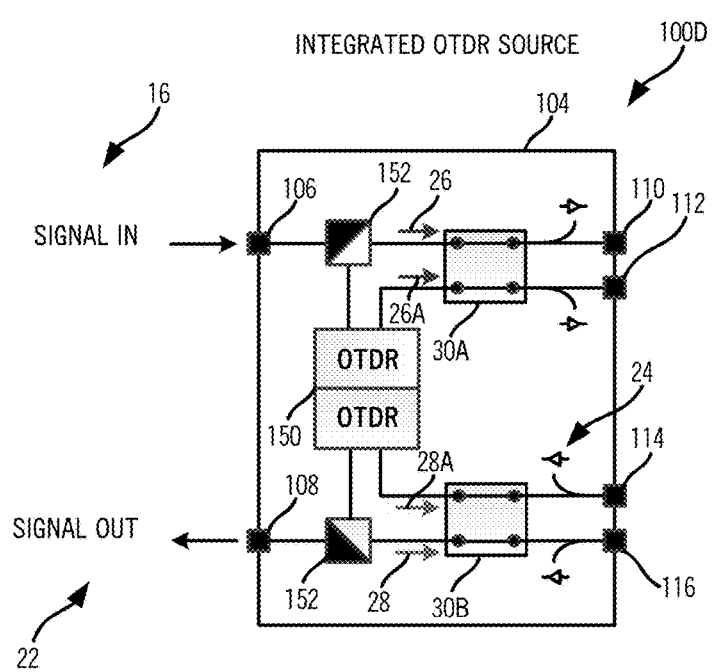
FIG. 9 is a block diagram of an OTDR interoperable trunk switch with an integrated OTDR system.

FIG. 9 is a block diagram of an OTDR interoperable trunk switch 100D with an integrated OTDR system 150. Similar to the OTDR interoperable trunk switch 100, 100A, 100C, the OTDR interoperable trunk switch 100D includes the 2×2 switches 30A, 30B. However, the OTDR interoperable trunk switch 100D does not include an OTDR port. Rather, the OTDR interoperable trunk switch 100D includes the integrated OTDR system 150 within the housing 104. The integrated OTDR system 150 provides the OTDR signals 26, 28, 26A, 28A. The OTDR signals 26, 28 are added with the input signal 16 and the output signal 22 via combiners 152 and the OTDR signals 26A, 28A are connected to inputs of the 2×2 switches 30A, 30B. The OTDR interoperable trunk switch 100D can be used without an external OTDR source (and without the OTDR ports 102, 102A, 102B).

Example Operation of the OTDR Interoperable Trunk Switch

Figure 10:
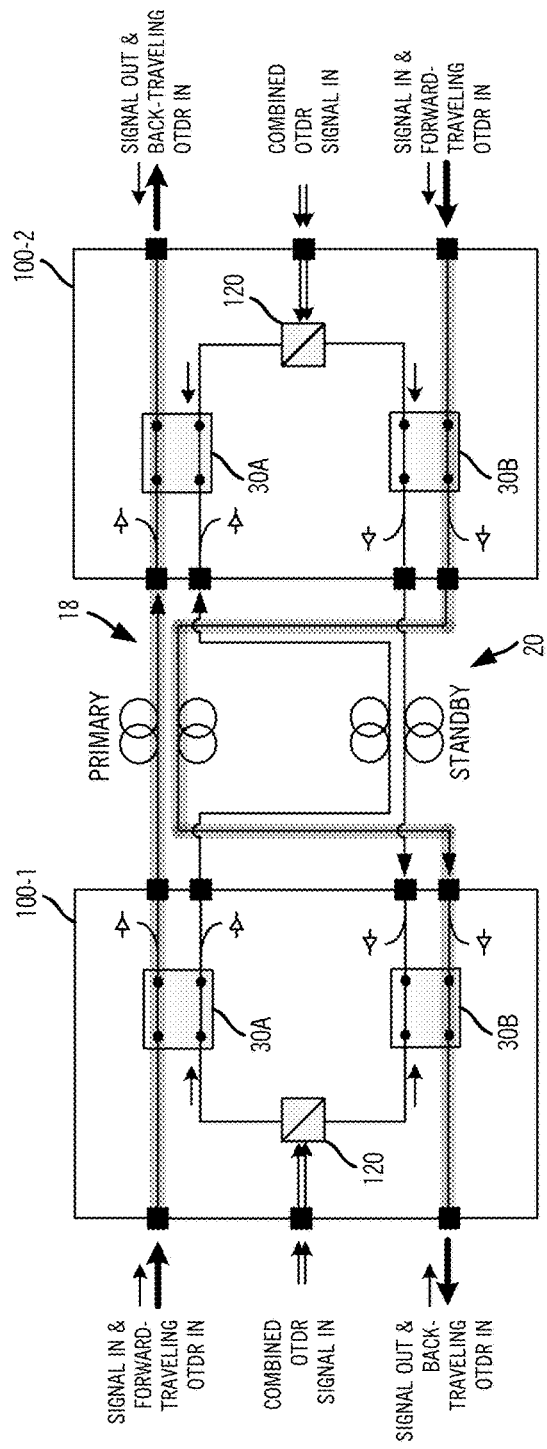
FIGS. 10-14 are network diagrams of OTDR interoperable trunk switches interconnected by the primary fiber path and the standby fiber path illustrating a sequence of events based on a fiber cut.
Figure 11:
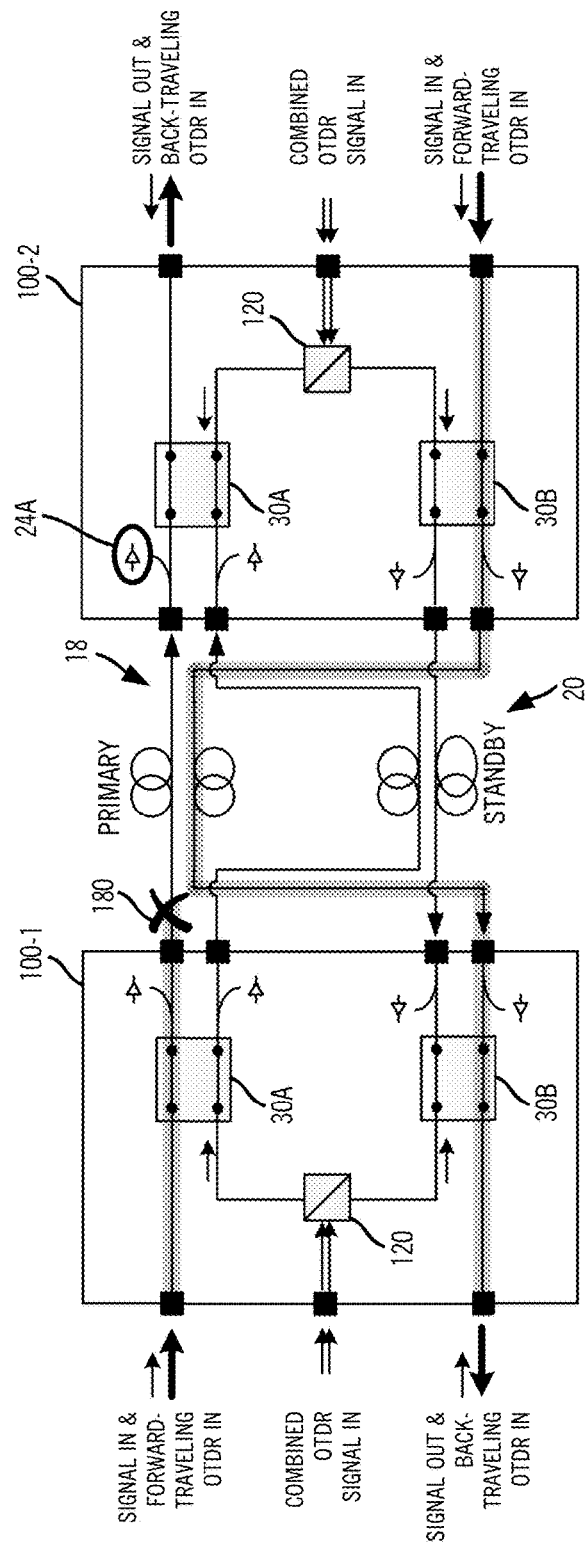
Figure 12:
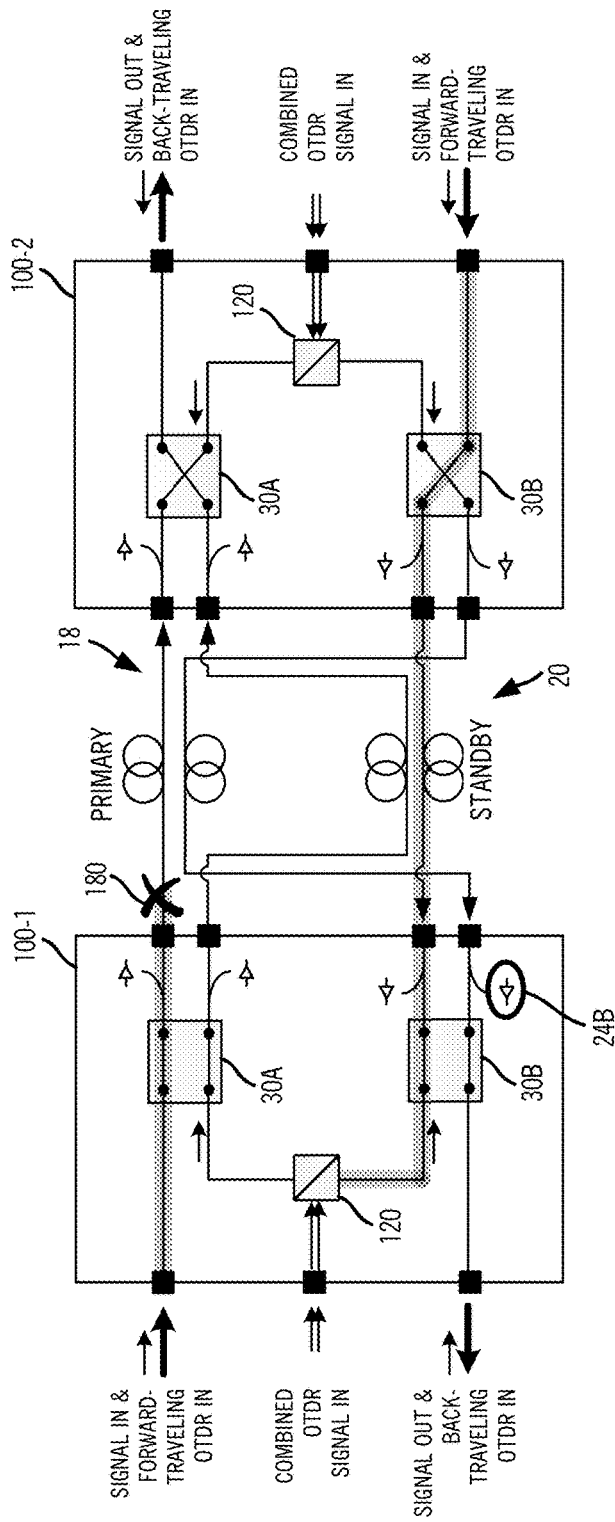
Figure 13:
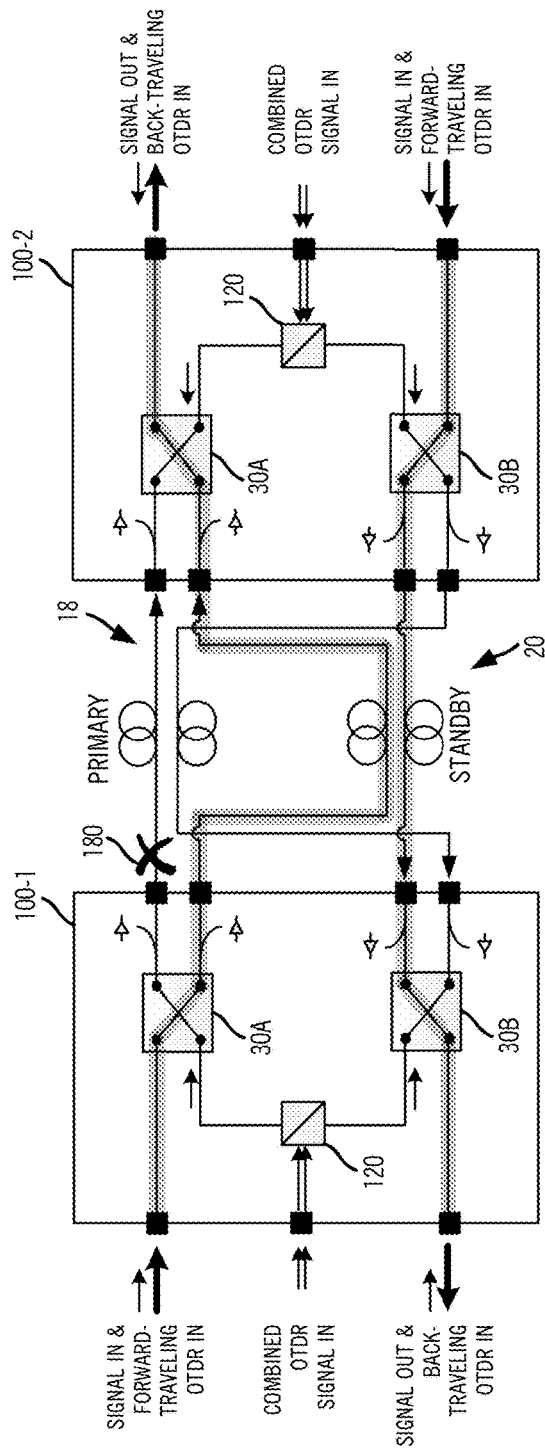

FIGS. 10-14 are network diagrams of OTDR interoperable trunk switches 100-1, 100-2 interconnected by the primary fiber path 18 and the standby fiber path 20 illustrating a sequence of events based on a fiber cut. In FIGS. 10-14, the highlight portions indicate the signal path. FIG. 10 illustrates normal operation wherein the OTDR interoperable trunk switches 100-1, 100-2 are both set to communicate over the primary fiber path 18. In FIG. 11, there is a fiber cut 180 on the primary fiber path 18 in the eastbound direction which is detected at the OTDR interoperable trunk switch 100-2 by a detector 24A. In FIG. 12, the OTDR interoperable trunk switch 100-2 switches data transmission from the primary fiber path 18 to the standby fiber path 20 which becomes the active fiber path. A detector 24B at the OTDR interoperable trunk switch 100-1 detects the loss of (data) light due to the switch by the OTDR interoperable trunk switch 100-2. In FIG. 13, the OTDR interoperable trunk switch 100-2 switches from the primary fiber path 18 to the standby fiber path 20 thereby restoring bidirectional data traffic.

Figure 14:
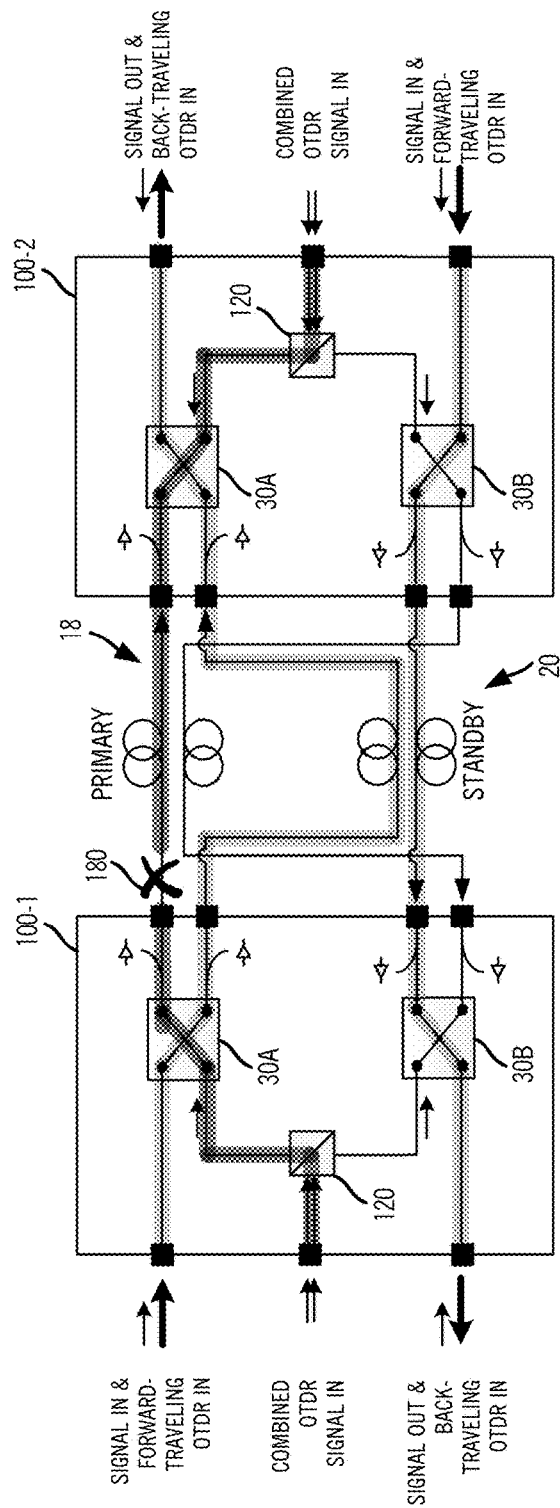

In FIG. 14, a highlighted path on the fiber with the fiber cut 180 shows that the OTDR (co-propagating, counter-propagating or both) can provide information to help localize the fault and subsequently validate a repair.

OTDR Module

Figure 15:
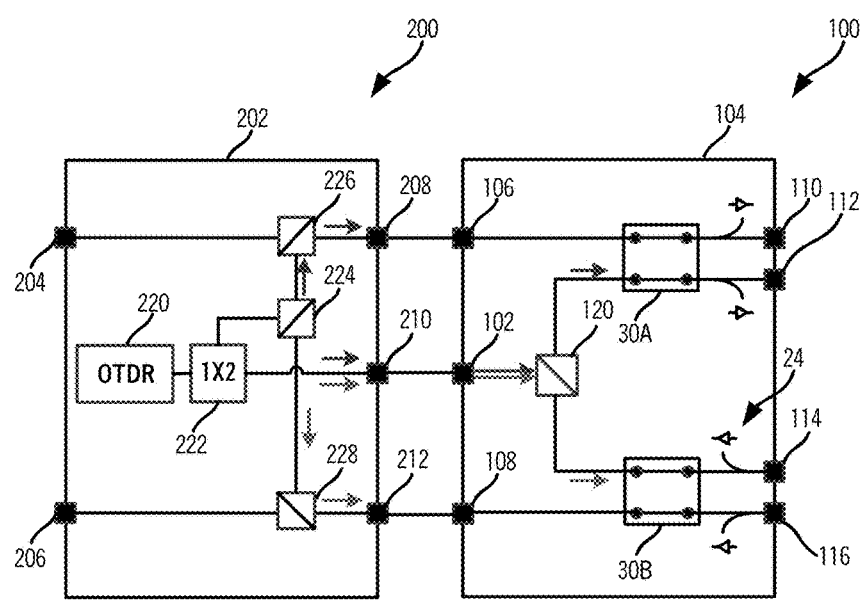
FIG. 15 is a block diagram of an OTDR module interconnected to the OTDR interoperable trunk switch.

FIG. 15 is a block diagram of an OTDR module 200 interconnected to the OTDR interoperable trunk switch 100. The OTDR module 200 can connect to the OTDR ports 102, 102A, 102B on the OTDR interoperable trunk switches 100, 100A, 100B, 100C. Note, the OTDR interoperable trunk switch 100D does not require an external OTDR based on the integrated OTDR system 150. The OTDR module 200 can be a standalone, pluggable, or integrated into another module in an optical networking system. For example, the OTDR module 200 can be integrated into a multiplexer/demultiplexer, optical amplifier, Optical Service Channel (OSC), or the like. Those skilled in the art will recognize optical networking systems can be realized with modules, network elements, nodes, line cards, etc. and the functionality of the OTDR module 200, the OTDR interoperable trunk switches 100, 100A, 100B, 100C, 100D, etc. contemplate various physical implementations. The OTDR module 200 is presented as an example of an OTDR system in an optical networking system that can be used with the OTDR interoperable trunk switches 100, 100A, 100B, 100C.

The OTDR module 200 includes a housing 202 with client-side ports 204, 206 and line-side ports 208, 210, 212. The client-side port 204 is for a data transmit direction, and the client-side port 206 is for a data receive direction. Note, there can be other components which are omitted for illustration purposes, such as multiple client-side ports connected to multiplexers/demultiplexers, etc. For illustration purposes, the OTDR module 200 includes a single OTDR system 220 connected to a 1×2 switch 222. The OTDR system 220 can monitor either the primary fiber path or the standby fiber path (i.e., the active or the inactive fiber path) based on the setting of the 1×2 switch 222. For OTDR monitoring of the inactive fiber path, the 1×2 switch 222 is connected to the OTDR port 102, i.e., the line-side port 210 is connected to the OTDR port 102. The OTDR system 220 in this example is configured with a single output with dual wavelengths. Thus the OTDR port 102 receives a single fiber, and the dual wavelengths are split by the red/blue splitter 120 in the OTDR interoperable trunk switch 100.

For OTDR monitoring of the active fiber path, the 1×2 switch 222 is connected to a splitter 224 which splits the dual wavelengths between the transmit direction and the receive direction. The transmit direction includes a combiner 226 which combines an input from the client-side port 204 with the OTDR signal split from the splitter 224. The receive direction includes a combiner 228 which adds the OTDR signal split from the splitter 224 towards the line-side port 212.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical trunk switch supporting an Optical Time-Domain Reflectometer (OTDR), the optical trunk switch comprising:
    a transmit switch configured to provide an input signal to one or more of a primary fiber path and a standby fiber path;
    a receive switch configured to provide an output signal from one of the primary fiber path and the standby fiber path; and
    an integrated OTDR system in a same housing as the transmit switch and the receive switch, wherein the integrated OTDR system has an OTDR connection to one or more of the transmit switch and the receive switch, wherein the integrated OTDR system is configured to provide one or more OTDR signals to monitor an inactive path of the primary fiber path and the standby fiber, based on configuration of the transmit switch and the receive switch.

2. The optical trunk switch of claim 1, wherein the transmit switch and the receive switch each comprise a 2×2 switch.

3. The optical trunk switch of claim 2, wherein the integrated OTDR system is connected separately to each of the transmit switch and the receive switch to provide a co-propagating OTDR signal on the inactive path in a transmit direction and a counter-propagating OTDR signal on the inactive path in a receive direction.

4. The optical trunk switch of claim 1, wherein the one or more OTDR signals comprise a co-propagating OTDR signal to monitor a transmit direction of the inactive path and a counter-propagating OTDR signal to monitor a receive direction of the inactive path.

5. The optical trunk switch of claim 1, wherein the OTDR connection includes one or more combiners configured to add the one or more OTDR signals to an active path of the primary fiber path and the standby fiber.

6. The optical trunk switch of claim 1, wherein the transmit switch and the receive switch each comprise a 2×2 switch with
a first input including a signal and a combiner which adds the one or more OTDR signals to the signal for an active path of the primary fiber path and the standby fiber, and
a second input which directly adds the one or more OTDR signals to the inactive path.

7. The optical trunk switch of claim 1, wherein the transmit 2×2 switch and the receive 2×2 switch each comprise a
a first input including a signal and a combiner which an OTDR signal to the signal for an active path of the primary fiber path and the standby fiber, and
a second input which directly adds the OTDR signal to the inactive path.

8. An optical trunk switch supporting an Optical Time-Domain Reflectometer (OTDR), the optical trunk switch comprising:
a transmit 2×2 switch configured to provide an input signal to an active path and to provide a co-propagating OTDR signal to an inactive path;
a receive 2×2 switch configured to provide an output signal from the active path and to provide a counter-propagating OTDR signal to the inactive path; and
an integrated OTDR system in a same housing as the transmit switch and the receive switch, wherein the integrated OTDR system has an OTDR connection to the transmit 2×2 switch and the receive 2×2 switch, wherein the integrated OTDR system is configured to provide the co-propagating OTDR signal and the counter-propagating OTDR signal, based on configuration of the transmit 2×2 switch and the receive 2×2 switch.

9. The optical trunk switch of claim 8, wherein the is integrated OTDR system connected separately to each of the transmit switch and the receive switch to provide the co-propagating OTDR signal on the inactive path in a transmit direction and the counter-propagating OTDR signal on the inactive path in a receive direction.

10. The optical trunk switch of claim 8, wherein the OTDR connection includes one or more combiners configured to add the one or more OTDR signals to an active path of the primary fiber path and the standby fiber.

11. A method for providing an optical trunk switch supporting an Optical Time-Domain Reflectometer (OTDR), the method comprising:
providing a transmit switch configured to provide an input signal to one or more of a primary fiber path and a standby fiber path;
providing a receive switch configured to provide an output signal from one of the primary fiber path and the standby fiber path; and
providing an integrated OTDR system in a same housing as the transmit switch and the receive switch, wherein the integrated OTDR system has an OTDR connection to one or more of the transmit switch and the receive switch, wherein the integrated OTDR system is configured to provide one or more OTDR signals to monitor an inactive path of the primary fiber path and the standby fiber, based on configuration of the transmit switch and the receive switch.

12. The method of claim 11, wherein the transmit switch and the receive switch each comprise a 2×2 switch.

13. The method of claim 11, wherein the one or more OTDR signals comprise a co-propagating OTDR signal to monitor a transmit direction of the inactive path and a counter-propagating OTDR signal to monitor a receive direction of the inactive path.

14. The method of claim 11, wherein the OTDR connection includes one or more combiners configured to add the one or more OTDR signals to an active path of the primary fiber path and the standby fiber.

15. The method of claim 11, wherein the transmit switch and the receive switch each comprise a 2×2 switch with
a first input including a signal and a combiner which adds the one or more OTDR signals to the signal for an active path of the primary fiber path and the standby fiber, and
a second input which directly adds the one or more OTDR signals to the inactive path.

* * * * *